United States Patent [19]

Loest et al.

[11] 4,075,068

[45] Feb. 21, 1978

[54] PROCESS FOR THE RECOVERY OF ALUMINUM FROM ALUNITE

[75] Inventors: Kent W. Loest, Broomfield; John T. Schaefer, Boulder, both of Colo.

[73] Assignees: Southwire Company, Carrollton, Ga.; National Steel Corporation, Pittsburgh, Pa.; Earth Sciences, Inc., Golden, Colo.

[21] Appl. No.: 704,512

[22] Filed: July 12, 1976

[51] Int. Cl.² .............................................. C01D 1/06
[52] U.S. Cl. ...................................... 204/93; 204/98; 204/104; 423/127
[58] Field of Search ........................... 204/98, 93, 104; 423/127

[56] References Cited

U.S. PATENT DOCUMENTS

| 3,554,895 | 1/1971 | McRae et al. ............... 204/180 P |
| 3,890,425 | 6/1975 | Stevens et al. .................. 423/127 |
| 3,890,426 | 6/1975 | Stevens et al. .................. 423/127 |
| 3,907,654 | 9/1975 | Radd et al. ........................ 204/98 |

Primary Examiner—Leland A. Sebastian
Attorney, Agent, or Firm—Herbert M. Hanegan; Stanley L. Tate; Robert S. Linne

[57] ABSTRACT

An improvement in the process for the recovery of aluminum from alunite in which potassium hydroxide is recovered from byproduct potassium sulfate by electrodialysis, further improvement being the use of sodium hydroxide from the bleed stream from the Bayer leach for use in the electrodialysis process for recovering potassium hydroxide from potassium sulfate.

8 Claims, 5 Drawing Figures

LEGEND (+) CATION PERMEABLE MEMBRANE
(−) ANION PERMEABLE MEMBRANE

PROCESS FOR THE RECOVERY OF ALUMINUM FROM ALUNITE

CROSS-REFERENCES TO RELATED APPLICATIONS

The present invention utilizes byproduct potassium sulfate and sodium hydroxide from the bleed stream from the Bayer leach in the processes for recovering aluminum from alunite ore disclosed in U.S. Pat. Nos. 3,890,425 and 3,890,426, assigned to a common assignee with this application. The combined processes of these two patents are referred to hereinafter as the basic process.

BACKGROUND OF THE INVENTION

The invention lies in the field of processes for the recovery of aluminum from its ores, and/or the manufacture of potassium hydroxide from potassium sulfate.

The present invention broadly comprises the manufacture of potassium hydroxide from potassium sulfate by electrodialysis. An improvement of the broad process is the use of sodium hydroxide in the electrodialysis process. The invention is peculiarly adapted for use with the basic process disclosed in the two above-mentioned patents, as the improvement utilizes byproduct potassium sulfate and sodium hydroxide from the bleed stream from the Bayer leach of the basic process to manufacture potassium hydroxide by electrodialysis for use in leaching the roasted alunite ore calcine.

The basic process is defined by the following process steps, some of which are optional, as illustrated in the specification and flow diagram of the referenced patents.

(1) roasting particulate alunite concentrate to remove water of hydration;

(2) removing sulfur compounds and alkali metal compounds, including potassium sulfate, from the roasted ore either by the procedure of U.S. Pat. No. 3,890,425 in which the roasted ore is subjected to a reducing roast and then to an oxidizing roast followed by leaching with potassium hydroxide, or by the process of U.S. Pat. No. 3,890,426 in which the roasted ore is leached directly with alkaline hydroxide, each alternate procedure terminating in a leaching step and leaving a residue containing aluminum values and a slurry of solution containing dissolved potassium sulfate;

(3) recovering potassium sulfate from the leach solution of (2) by crystallization, and recycling the mother liquor to the leaching step while bleeding a stream therefrom;

(4) digesting the residue from the leaching step with alkali metal hydroxide solution to convert aluminum values in the residue to soluble aluminate;

(5) precipitating silica from the resulting solution of step (4) to leave a solution of auminate and a residue known as a desilication product consisting essentially of sodium aluminum silicate along with other impurities;

(6) precipitating aluminum values from the solution of step (5);

(7) recycling the mother liquor from step (6) to the digesting step while removing a bleed stream therefrom, and (8) recovering product aluminum from the aluminum values of step (6).

The expression "roasting and leaching to remove water and compounds of sulfur and alkali metals" as used herein includes the two procedures of step (2) above.

Processes from the production of aluminum from alunite must be as economical as possible in order to produce a commercial grade product which is competitive with the product produced from bauxite. This necessarily means utilization of byproducts wherever possible. Potassium hydroxide is the preferable leaching agent for leaching the calcined alunite ore of the basic process, and this leaching agent must ordinarily be purchased commercially. Conversion of byproducts from the basic process into this essential and somewhat expensive chemical for the above leaching step is a desired objective.

Accordingly, it is an object of this invention to provide a process for the economic utilization of the byproduct potassium sulfate and bleed stream sodium hydroxide from the basic process. A further object of the invention is to provide a process for the production of potassium hydroxide from potassium sulfate by electrodialysis with or without the use of sodium hydroxide.

SUMMARY OF THE INVENTION

The invention is a process for the production of potassium hydroxide from potassium sulfate by electrodialysis in single or multiple frame cells as described hereinafter, with or without the use of sodium hydroxide. A modification of the invention is the production of potassium hydroxide by electrodialysis from byproduct potassium sulfate in the basic process, followed by recycling the produced potassium hydroxide to the leaching step. A further modification is the recycling of byproduct sodium hydroxide from the Bayer leach procedure for use in the production of potassium hydroxide from byproduct potassium sulfate.

DESCRIPTION OF THE PREFERRED EMBODIMENT

Figure 1:
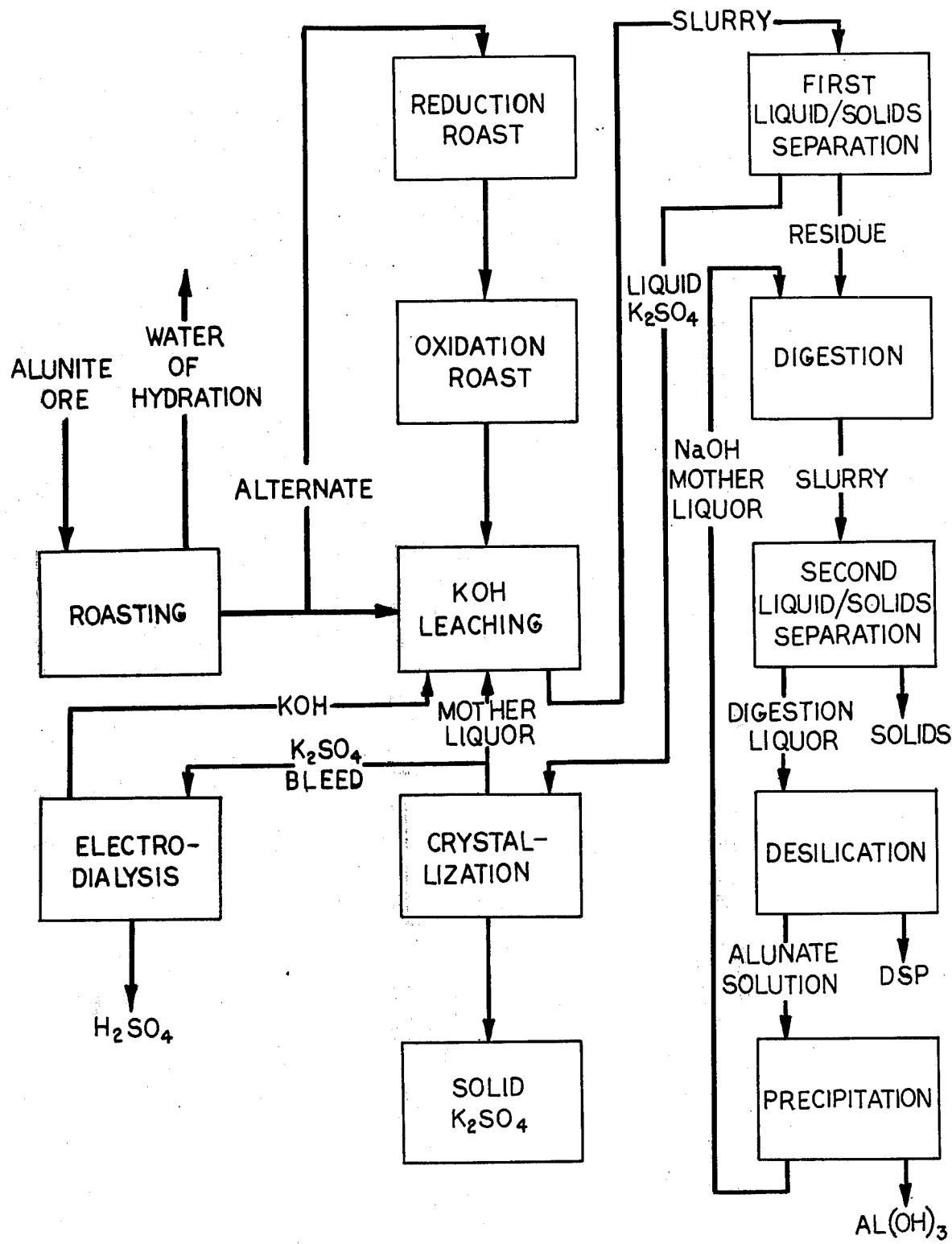
FIG. 1 is a flow diagram of the improved process of the invention showing the electrodialysis step for producing potassium hydroxide from byproduct potassium sulfate incorporated into the flow sheet of the basic process.

Referring to the flow diagram of FIG. 1, illustrating the continuous process of the invention, it will be seen that alunite ore is processed by the basic process to recover aluminum and produce byproduct potassium sulfate, indicated in the diagram as "liquid $K_2SO_4$." Some of the potassium sulfate is recovered by crystallization, and the mother liquor recycled to the potassium hydroxide leaching step. Some of the byproduct potassium sulfate is bled off from the mother liquor stream and subjected to electrodialysis to produce potassium hydroxide, which is recycled to the potassium hydroxide leaching step, this latter being the improvement invention applied to the basic process for converting byproduct potassium sulfate into expensive leaching reagent. Sulfuric acid, hydrogen, and oxygen are byproducts of the electrodialysis step and could be used as reducing agents ($H_2$) or for non-polluting fuel, etc.

Figure 2:
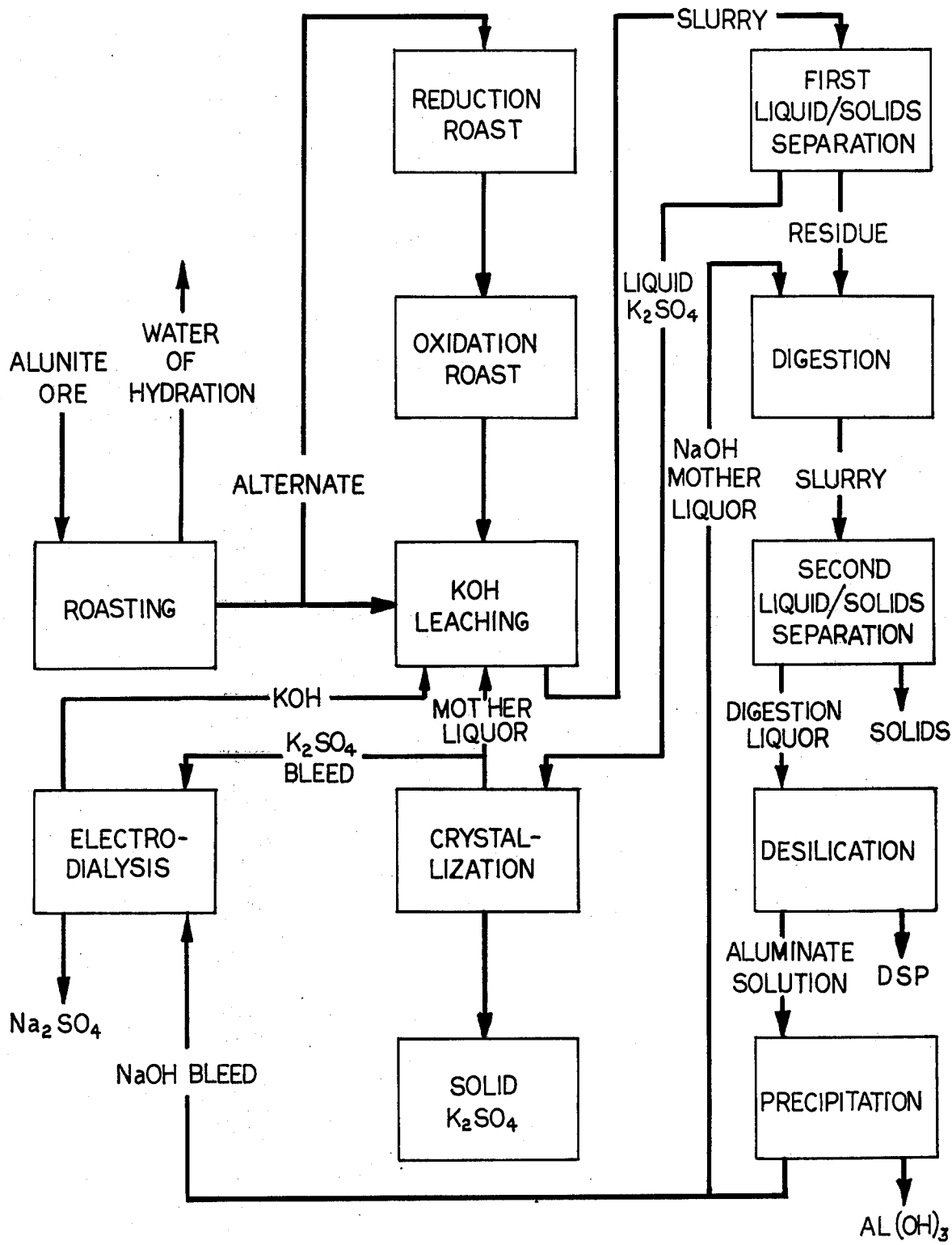
FIG. 2 is a schematic diagram similar to that of FIG. 1 showing the further modification of cycling bleed stream sodium hydroxide from the Bayer leach procedure to the electrodialysis step shown in FIG. 1.

Referring to FIG. 2, it is seen that a bleed stream is taken from the mother liquor stream being sent from the aluminum hydroxide precipitation step to the Bayer digestion step, the bleed stream being sent to the electrodialysis step to provide sodium hydroxide for use in the production of potassium hydroxide from potassium sulfate.

Figure 3:
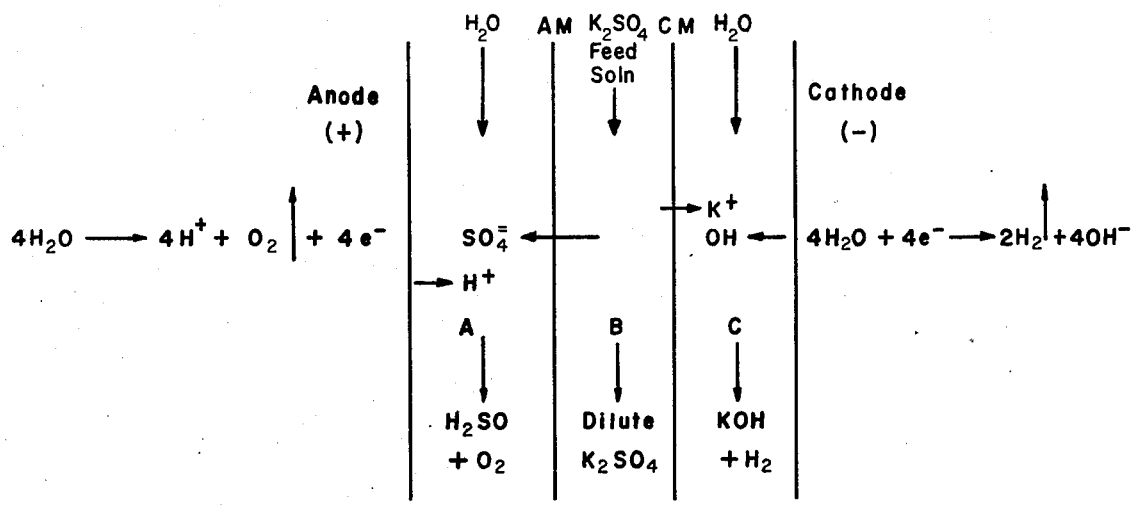
FIG. 3 is a schematic showing of an electrodialysis cell of the invention, the cell comprised of a single frame made up of three compartments.

Referring to FIG. 3, the cell is comprised of the usual anode and cathode, an anion permselective membrane adjacent the anode and a cation permselective membrane adjacent the cathode. By this arrangement, the cell is divided into an anion compartment "A," a cation compartment "C," and an intermediate liquor compartment "B."

In using the cell, water is introduced into compartments "A" and "C" and potassium sulfate is introduced into compartment "B," with the application of electrical potential between the electrodes. As shown, sulfate ions travel through the anion perselective membrane into the anode compartment to unite with hydrogen ions produced from the added water to produce sulfuric acid and oxygen. Potassium ions travel through the cation permselective membrane into the cathode compartment to unite with $OH^-$ ions from the introduced water to produce potassium hydroxide and hydrogen. Ionic equations are shown for the reactions in the anode and cathode compartments.

Figure 4:
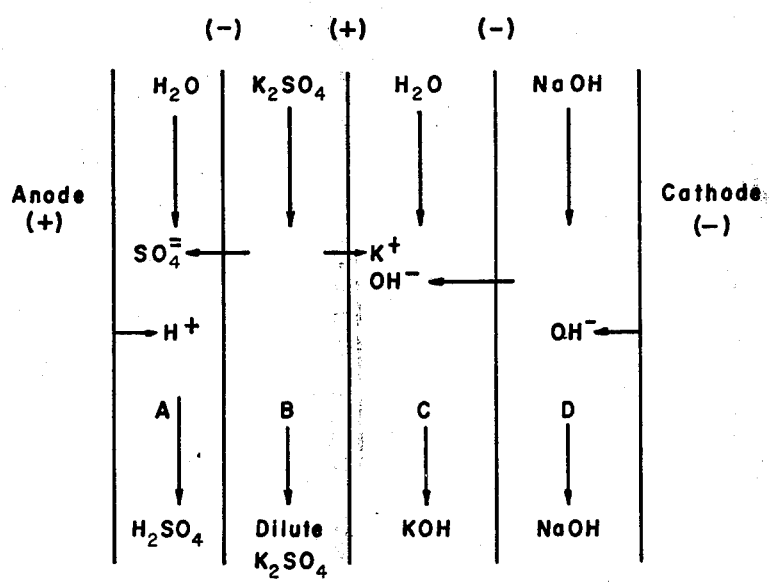
FIG. 4 is a schematic showing of a four compartment single frame cell of the invention utilizing sodium hydroxide in the manufacture of potassium hydroxide from potassium sulfate.
Figure 5:
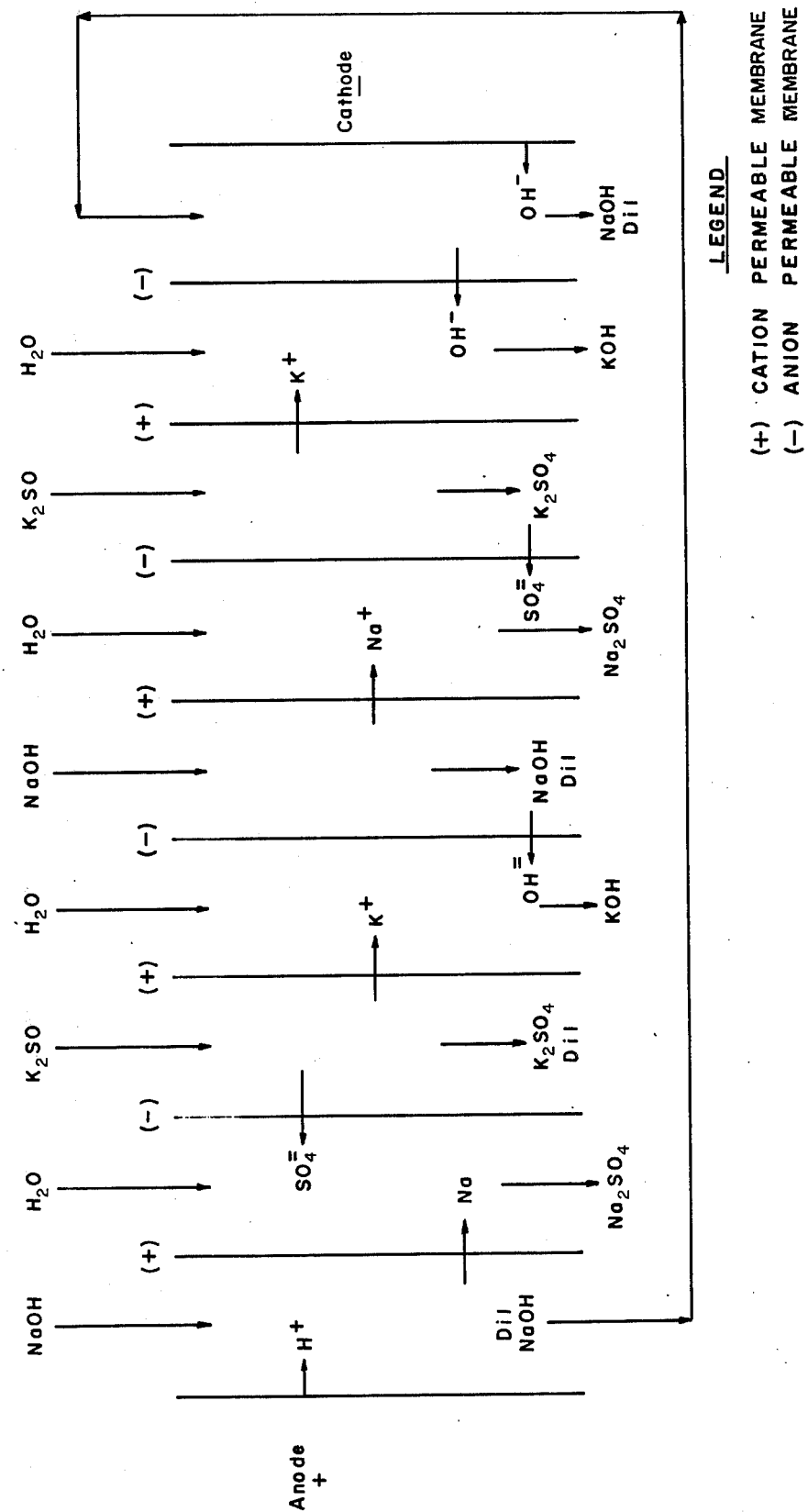
FIG. 5 is a schematic showing of a multi-frame cell comprised of single frames shown in FIG. 4.

Referring to FIG. 4, a central cation permselective membrane and anion permselective membranes on each side thereof divide the cell having an anode and a cathode into compartments "A," "B," "C," and "D." Water is introduced into compartments "A" and "C" as potassium sulfate is introduced into compartment "B" and sodium hydroxide into compartment "D." The products of the cell are sulfuric acid from compartment "A," dilute potassium sulfate from compartment "B," potassium hydroxide from compartment "C," and purified sodium hydroxide from compartment "D." The multi-frame cell of FIG. 5 using a multiplicity of the frames shown in FIG. 4 operates correspondingly to the cell of FIG. 4, but products byproduct $Na_2SO_4$ in place of purified NaOH.

Electrodialysis procedure for other applications is fully disclosed in the prior art. A full description of the electrodialysis procedure and equipment for upgrading brakish water is given in the book entitled "The Demineralization by Electrodialysis" edited by J. R. Wilson, London, Butterworths Scientific Publications, 1960. Other conventional electrodialysis cells and procedures for operating them are fully disclosed in U.S. Pat. No. 3,869,364. The disclosure of this patent includes conventional anion and cation permselective membranes. U.S. Pat. No. 3,136,710 discloses the advantages obtained by using multiple frame electrodialysis cells.

U.S. Pat. No. 3,554,895 discloses (column 4) an electrolytic process for making potassium hydroxide from potassium sulfate performed in a cell using a porous membrane adjacent the anode to form the anode compartment for the purpose of producing equal molar solutions of $H_2SO_4$ and $K_2SO_4$ in the anode compartment. An equal molar $H_2SO_4$ and $K_2SO_4$ solution is in effect a solution of potassium bisulfate. The $KHSO_4$ product is used in a later step of their process to produce $SO_2$ from $K_2SO_3$.

The cell configuration of the present invention uses an anion-permselective membrane separating the central feed compartment "B," and the anode compartment. The purpose and advantage of such a system is to produce a pure product stream of sulfuric acid with no contamination from cations in the feed cell compartment. The pure product $H_2SO_4$ becomes a marketable chemical when being produced in conjunction with KOH from $K_2SO_4$ solution. There is a difference in the cell design, the products, and effluents produced.

The ionic reactions taking place in the cell of FIG. 3 will be described.

The ion selective membranes are made of thin sheets of synthetic ion exchange resin containing fixed ion exchange groups, and these membranes are well known in the art. Cation permeable membranes (CM) permit the passage of cations selectively and anion permeable membranes (AM) permit the passage of anions selectively. The membranes are placed between the feed stream compartments to allow the proper migration of $K^+$ and $SO_4^{--}$ from the $K_2SO_4$ solution to form their respective product solutions.

The transport of ions from the solution phase through the resin phase is effected by an electromotive driving force. The cell compartments are placed between chemically stable electrodes and a direct current power supply is used to create a driving potential across these electrodes. The cathode takes a negative charge due to a buildup of electrons. This in turn causes positive ions to be attracted in the direction of the cathode. The anode becomes deficient in electrons creating a positive polarity and anions migrate toward it.

In the electrolysis process, the electromotive force and chemical conversion are effected at the expenditure of electrical energy. Pure water with a strongly ionized electrolyte dissolved in it becomes a good conductor. When the circuit of an electrolytic cell is closed, the cathode becomes negatively charged and positive ions migrate toward the cathode where they acquire electrons of high potential energy in a reduction process. Negative ions, alternately, migrate toward the positive anode and are oxidized by giving up electrons of low potential energy. The loss of electrons by the cathode and the acquisition of a like number of electrons by the anode is in effect the conduction of electricity through the cell. The conduction of electricity through an electrolyte solution together with the resulting chemical changes is electrolysis. The end result of electrolysis depends upon the nature of the electrolytes.

In the $K_2SO_4$ electrodialysis cell of FIG. 3, $K^+$ and $SO_4^{--}$ ions are present in the central compartment cell "B." When the circuit is closed, the positively charged $K^+$ ions migrate through the cation permeable membrane to the cathode, where they are reduced forming intermediate potassium atoms. Potassium atoms, however, have a very low ionization potential and immediately react with water to form KOH and $H_2$ gas.

$$K^+ + e^- \rightarrow K^o$$

$$2K^o + 2H_2O \rightarrow 2KOH + H_2\uparrow \text{ (Cathode reduction and accompanying reaction)}$$

Negatively charged $SO_4^{--}$ ions from compartment "B" are attracted toward the anode in compartment "A" through the anion permeable membrane. At the same time, $OH^-$ ions from the weak ionization of water also migrate to the anode. Although the $SO_4^{--}$ concentration is greater than $OH^-$, the $OH^-$ ions from water ionization are preferentially oxidized, each ion giving up an electron to the anode. For every four $OH^-$ ions discharged, one molecule of oxygen gas is formed.

$$4OH^- \rightarrow 2H_2O + O_2\uparrow + 4e^- \text{ (Anode oxidation)}$$

The removal of $OH^-$ ions from the solution disturbs the ionization equilibrium and additional water molecules ionize, supplying additional $OH^-$ and $H^+$ ions. The formation of $H^+$ ions is necessary to balance the charge of $SO_4^{--}$ ions migrating into compartment "A" to form an ionized solution of $H_2SO_4$. The overall net reaction in the anode compartment involves the ionization of water and the oxidation of hydroxide ions to give oxygen gas, hydrogen ions and electrons.

$$4H_2O \rightleftarrows 4H^+ + 4OH^-$$
$$\underline{4OH^- \rightarrow O_2 + 2H_2O + 4e^-}$$
$$2H_2O \rightarrow O_2 + 4H^+ + 4e^-$$

The overall product capacity of the three compartment electrolytic cell per Faraday of electricity at 100% current efficiency would be:
1. Compartment "C" — 1 eq. wt. of KOH = 1 mole = 56g
2. Compartment "A" — 1 eq. wt. of $H_2SO_4$ = 1/2 mole = 49g
3. Anode — 1/4 mole of $O_2$ = 5.6 liters at STP
4. Cathode — 1/2 mole of $H_2$ = 11.2 liters at STP In controlled laboratory testing, using the cell of FIG. 3, KOH solution was produced in an attempt to measure the efficiency of the cell in making the chemical conversion, and a cost analysis was made based on power consumed. Current efficiency was based on the equivalent weight of potassium transferred from cell "B" to cell "C" to the equivalents of electrical energy supplied. Cost of production was based upon the electrical power supplied during the experiments.

In making the tests, 70 grams per liter of potassium sulfate was introduced into compartment "B" as water was introduced into compartments "A" and "C." The results obtained for two complete tests are given in Tables 1 and 2 below.

It will be seen that in the first test, the percent current efficiency based on $K^+$ ion transferred to cell "C" was 90.8 percent, and for the second experiment it was 97.7 percent.

Other membrane electrodialysis tests have shown that KOH can be concentrated to much higher levels than those shown in the test data. In fact, power requirements have actually shown continuous drop when concentrating solutions up to 100 grams per liter caustic concentration.

As shown in FIG. 1, the electrodialysis procedure can be incorporated into the flow diagram of the basic process to produce potassium hydroxide from byproduct potassium sulfate.

Another modification is illustrated by FIG. 4, in which the formation of potassium hydroxide from potassium sulfate involves the use of sodium hydroxide solution in the electrodialysis cell. This approach makes possible the use of byproduct sodium hydroxide from the Bayer liquor bleed stream of the basic process. The sodium hydroxide is not used in any other way than to supply $OH^-$ ions, which are replaced by the cathode reaction. An improved usefulness of this approach lies in the possibility of expanding the cell to a true electrodialysis multi-compartment unit as shown in FIG. 5, which would produce potassium hydroxide at a lower cost and give byproduct sodium sulfate as shown in FIG. 5. These cells are readily incorporated into the basic process as shown in the flow sheet of FIG. 2 wherein the sodium hydroxide used is from the bleed stream from the aluminum hydroxide precipitation step.

It is an advantage of the invention that the process can be performed continuously in conjunction with the production of aluminum from alunite in the basic process with the continuous production of potassium hydroxide, which is cycled to the leaching step. This makes possible the use of products which are ordinarily byproducts for the production of expensive reagents used in the basic process.

TABLE ONE

| Description | Vol. | $K^+$ g/l | $S^=$ g/l | Calculated Molar Concentration | g/l as KOH |
|---|---|---|---|---|---|
| Feed $K_2SO_4$ solution | 1 liter | 36.99 | 13.19 | 0.9460 | — |
| Cell "A" product solution ($H_2SO_4$) | 870 ml. | 0.88 | 3.97 | 0.0225 | — |
| Cell "B" effluent solution ($K_2SO_4$) | 870 ml. | 22.55 | 9.774 | 0.5767 | — |
| Cell "C" product solution (KOH) | 935 ml. | 11.76 | 0.10 | 0.3008 | 17.8 |

TABLE TWO

| Description | Vol. | $K^+$ g/l | $S^=$ g/l | Calculated Molar Conc. | (calculated) |
|---|---|---|---|---|---|
| $K_2SO_4$ feed into cell "B" | 1000 ml. | 47.26 | 19.35 | — | — |
| Cell "A" product solution ($H_2SO_4$) | 940 ml. | .08 | 7.67 | .240 M $H_2SO_4$ | — |
| Cell "B" effluent ($K_2SO_4$) | 810 ml. | 22.92 | 10.28 | — | — |
| Cell "C" product solution (KOH) | 960 ml. | 31.56 | 0.14 | .809 M KOH | 45.3 g/l KOH |

What is claimed is:
1. A process for producing potassium hydroxide from potassium sulfate by electrodialysis in a single frame electrodialysis cell, said frame comprising: in successive positions, an anode compartment, an intermediate compartment and a cathode compartment, an anion permselective membrane between the anodic and the intermediate compartments, a cation ermselective membrane between the intermediate and cathodic compartments, the arrangement forming anodic and cathodic compartments and an intermediate compartment, which process comprises: adding water to the anodic compartment, potassium sulfate to the intermediate compartment, water to the cathodic compartment, and applying a direct current electrical potential across the solutions to produce potassium hydroxide in the cathodic compartment, sulfuric acid in the anodic compartment and dilute potassium sulfate solution in the intermediate compartment.

2. A process for the manufacture of potassium hydroxide from potassium sulfate by electrodialysis which comprises: providing ionizable aqueous solutions in successive positions, said ionizable aqueous solutions comprising water, potassium sulfate and water, placing an anion permselective membrane between said first recited water and potassium sulfate, placing a cation permselective membrane between said potassium sulfate and said second recited water, and establishing a direct current electrical potential across said aqueous solutions.

3. A process for producing potassium hydroxide from potassium sulfate and sodium hydroxide by electrodialysis in a single frame electrodialysis cell, said frame comprising: in successive positions, an anodic compartment, a first intermediate compartment, a second intermediate compartment and a cathodic compartment, an anion permselective membrane between said anodic and intermediate compartments, a cation permselective membrane between the two intermediate compartments and an anion permselective membrane between said second intermediate compartment and said cathodic compartment, the arrangment forming anodic and cathodic compartments and two intermediate compartments, which process comprises: adding water to the anodic compartment, adding potassium sulfate to said first intermediate compartment, adding water to said second intermediate compartment, adding sodium hydroxide to said cathodic compartmemt, and applying a direct current electrical potential across the solutions to produce sulfuric acid in said anodic compartment, dilute potassium sulfate in said first intermediate compartment, potassium hydroxide in said second intermediate compartment and purified sodium hydroxide in said cathodic compartment.

4. The process of claim 3 performed in a multiple frame electrodialysis cell including at least two of said single frames.

5. The process of claim 2 in which said electrodialysis step is performed in a multiple frame electrodialysis cell including at least two of said single frames.

6. The process of claim 5 prior to which in step (b) the calcined ore is subjected to a reducing roast followed by an oxidizing roast prior to leaching to dissolve compounds of sulfur and alkali metals.

7. A process for the manufacture of potassium hydroxide from potassium sulfate and sodium hydroxide by electro-dialysis which comprises: providing ionizable aqueous solutions in successive positions, said ionizable aqueous solutions comprising water, potassium sulfate solution, water and sodium hydroxide solution, placing an anion permselective membrane between said first recited water and said potassium sulfate solution, placing a cation permselective membrane between said potassium sulfate solution and said second recited water, placing an anion permselective membrane between said second recited water and said sodium hydroxide solution, and establishing a direct current electrical potential across said aqueous solutions.

8. The process of claim 1 performed in a multiple frame electrodialysis cell including at least 2 of said single frames.

* * * * *